(12) United States Patent
Oneda et al.

(10) Patent No.: US 9,311,562 B2
(45) Date of Patent: Apr. 12, 2016

(54) IMAGE RETRIEVAL SYSTEM, INFORMATION PROCESSING APPARATUS, IMAGE RETRIEVAL METHOD, AND NON-TRANSITORY COMPUTER READABLE MEDIUM

(71) Applicant: FUJI XEROX CO., LTD., Minato-ku, Tokyo (JP)

(72) Inventors: Yuichi Oneda, Kanagawa (JP); Kenichiro Fukuda, Kanagawa (JP); Shinpei Noda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 6 days.

(21) Appl. No.: 14/211,007

(22) Filed: Mar. 14, 2014

(65) Prior Publication Data

US 2015/0055878 A1 Feb. 26, 2015

(30) Foreign Application Priority Data

Aug. 22, 2013 (JP) ................................. 2013-172375

(51) Int. Cl.
  *G06K 9/00* (2006.01)
  *G06K 9/46* (2006.01)
  *G06F 17/30* (2006.01)
(52) U.S. Cl.
  CPC ........ *G06K 9/4671* (2013.01); *G06F 17/30244* (2013.01)

(58) Field of Classification Search
  None
  See application file for complete search history.

(56) References Cited

U.S. PATENT DOCUMENTS

| | | | |
|---|---|---|---|
| 6,519,627 B1 * | 2/2003 | Dan et al. ...................... | 709/203 |
| 2002/0080996 A1 * | 6/2002 | Rhoads .............. | G06K 9/00442 382/100 |
| 2002/0154144 A1 * | 10/2002 | Lofgren et al. ... | G06F 17/30247 345/634 |
| 2006/0285172 A1 * | 12/2006 | Hull et al. ..................... | 358/448 |
| 2007/0143272 A1 | 6/2007 | Kobayashi | |
| 2011/0007934 A1 * | 1/2011 | Springmann et al. ......... | 382/100 |

FOREIGN PATENT DOCUMENTS

| | | |
|---|---|---|
| JP | 2007-164648 A | 6/2007 |
| JP | 2010-102501 A | 5/2010 |
| JP | 2010-211262 A | 9/2010 |

* cited by examiner

*Primary Examiner* — David F Dunphy
(74) *Attorney, Agent, or Firm* — Sughrue Mion, PLLC

(57) ABSTRACT

An image retrieval system includes an obtaining unit that obtains a query image, a specifying information extracting unit that extracts, from the query image, specifying information which specifies an image group as a retrieval target, a feature information extracting unit that extracts, from the query image, feature information to be used in image retrieval processing, and a retrieval unit that performs the image retrieval processing on retrieval target images specified by the specifying information, using the feature information.

11 Claims, 17 Drawing Sheets

| SPECIFYING INFORMATION | IMAGE IDENTIFIER | LOCAL FEATURE AMOUNT | CONTENT INFORMATION |
|---|---|---|---|
| G001 | IMG-1 | Vs1<br>・・・<br>Vsk | Ct-1 |
| | IMG-2 | ・・・<br>・・・<br>・・・ | Ct-2 |
| | ・・・ | ・・・ | ・・・ |
| | IMG-N | ・・・<br>・・・<br>・・・ | Ct-N |
| G002 | IMG-a | ・・・<br>・・・<br>・・・ | Ct-a |
| | IMG-b | ・・・<br>・・・<br>・・・ | Ct-b |
| | ・・・ | ・・・ | ・・・ |
| | IMG-M | ・・・<br>・・・<br>・・・ | Ct-M |
| G003 | ・・・ | ・・・ | ・・・ |
| ・・・ | ・・・ | ・・・ | ・・・ |

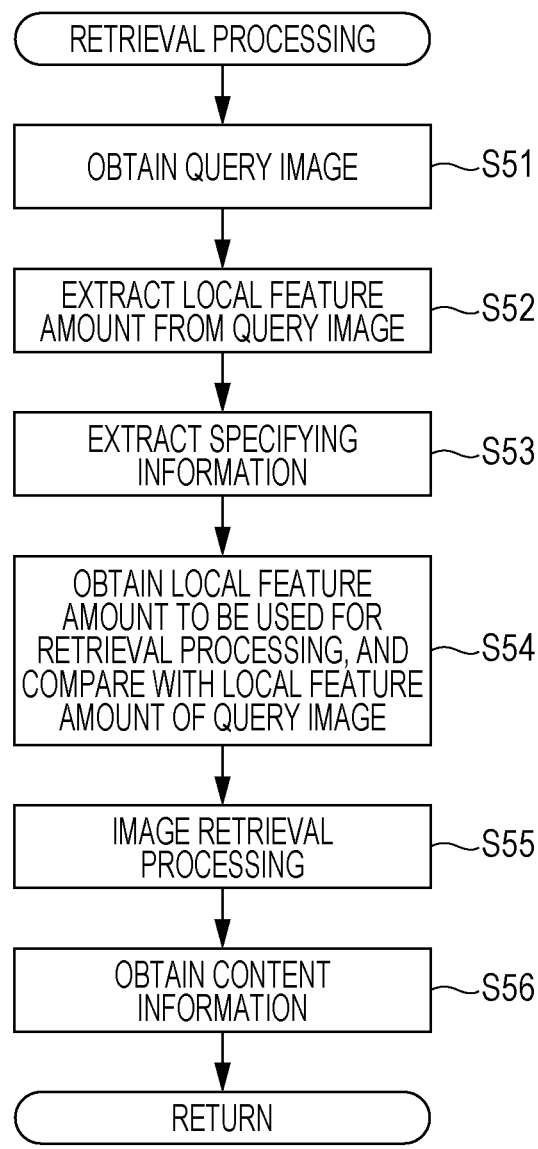

FIG. 12A
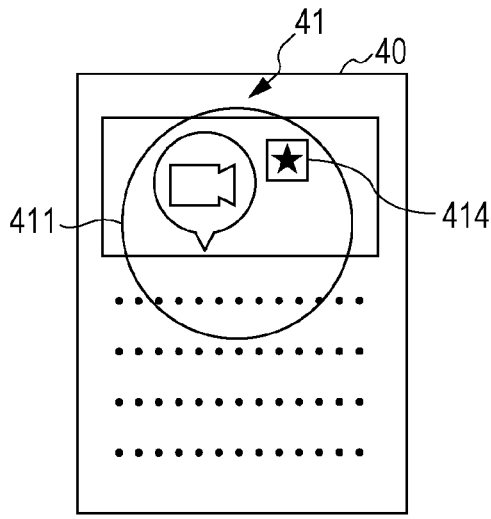
FIG. 12B
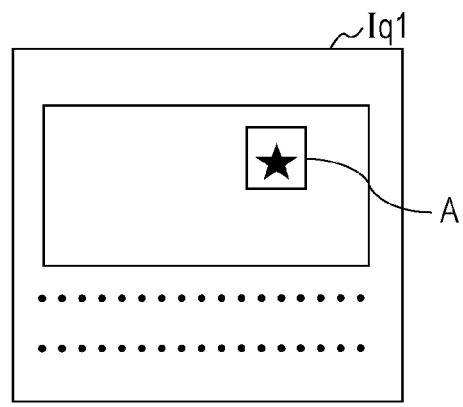
FIG. 12C
| SPECIFYING INFORMATION | ADDED IMAGE |
|---|---|
| G001 | IMG0001 |
| G002 | IMG0002 |
| G003 | IMG0003 |
| ... | ... |
FIG. 13
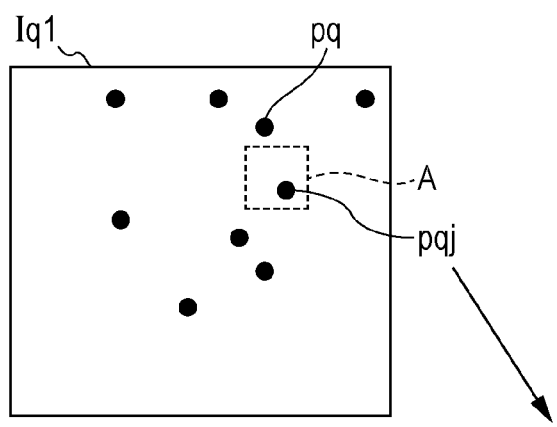

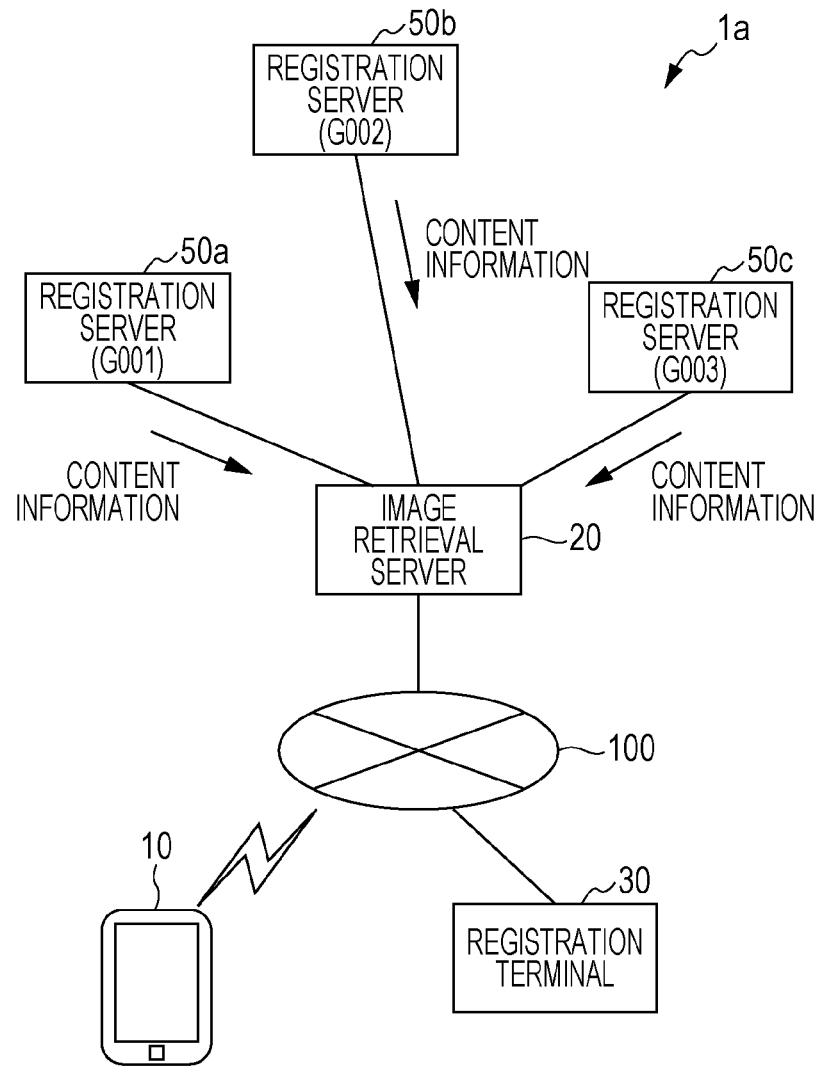

IMAGE RETRIEVAL SYSTEM, INFORMATION PROCESSING APPARATUS, IMAGE RETRIEVAL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-172375 filed Aug. 22, 2013.

BACKGROUND (i) Technical Field

The present invention relates to an image retrieval system, an information processing apparatus, an image retrieval method, and a non-transitory computer readable medium.

(ii) Related Art

When performing image retrieval processing, the processing amount of the image retrieval processing is reduced by selecting, as retrieval targets, only the retrieval target images corresponding to a query image, instead of selecting all the registered retrieval target images.

SUMMARY

According to an aspect of the invention, there is provided an image retrieval system including: an obtaining unit that obtains a query image; a specifying information extracting unit that extracts, from the query image, specifying information which specifies an image group as a retrieval target; a feature information extracting unit that extracts, from the query image, feature information to be used in image retrieval processing; and a retrieval unit that performs the image retrieval processing on retrieval target images specified by the specifying information, using the feature information.

BRIEF DESCRIPTION OF THE DRAWINGS

Exemplary embodiments of the present invention will be described in detail based on the following figures, wherein:

FIG. 5 illustrates an exemplary configuration of an image retrieval database according to the first exemplary embodiment;

FIG. 10 is a flowchart illustrating the flow of retrieval processing according to the first exemplary embodiment;

FIGS. 12A through 12C illustrate a method by which an image retrieval system extracts specifying information according to a second exemplary embodiment;

FIG. 13 illustrates a specific example of retrieval processing according to a variation (1) of the second exemplary embodiment;

FIG. 16 illustrates the overall configuration of an image retrieval system according to a variation 1;

FIG. 17 illustrates an exemplary configuration of an apparatus management table according to the variation 1;

DETAILED DESCRIPTION

Exemplary embodiments of the present invention will be described with reference to the accompanying drawings.

First Exemplary Embodiment

Figure 1:
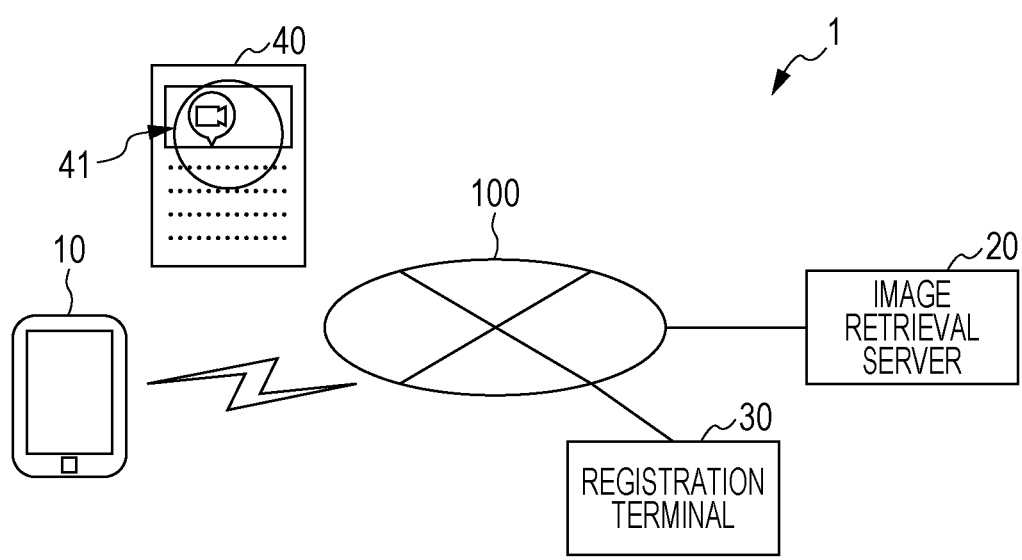
FIG. 1 illustrates the overall configuration of an image retrieval system according to a first exemplary embodiment.

FIG. 1 illustrates the overall configuration of an image retrieval system 1 according to a first exemplary embodiment. As illustrated in FIG. 1, the image retrieval system 1 is an information processing system that performs image retrieval, and includes a user terminal 10, an image retrieval server 20, and a registration terminal 30. Although only one user terminal 10 and one registration terminal 30 are illustrated in FIG. 1, there are actually two or more user terminals 10 and two or more registration terminals 30. The user terminal 10, the image retrieval server 20, and the registration terminal 30 connect to a communication network 100 so as to communicate with each other. The communication network 100 may be any types of communication networks, including the Internet, for example.

The user terminal 10 is a communication terminal having an image capturing function (a camera function). The user terminal 10 captures an image of a printed material 40 of FIG. 1, and transmits a query image requesting an image retrieval to the image retrieval server 20. The query image is image data serving as a retrieval key of image retrieval executed by the image retrieval server 20, and is data representing, in the form of an image, a request to the image retrieval server 20 for execution of image retrieval. The image retrieval server 20 is an image processing apparatus that retrieves an image (a retrieval target image described below) similar to the query image received from the user terminal 10. The printed material 40 is a medium (paper medium) on which image elements such as text and photographs are printed. Examples of the printed material 40 include flyers, brochures, and magazines.

On the printed material 40, a marker 41 called an embedded media marker (EMM) is printed on the image element. The marker 41 is a mark indicating that a digital content is associated with the image element of the printed material 40. The marker 41 is printed in a relatively light color so as not to be an obstacle for the user to visually recognize the image element of the printed material 40. The registration terminal 30 is a communication terminal used by, for example, a content provider, and registers information on EMM and information on digital contents in the image retrieval server 20.

In this example, the user terminal 10 is a smart phone. However, the user terminal 10 may be any other types of communication terminals that have an image capturing function, such as mobile phone terminal, tablet terminal, notebook computer, personal digital assistant (PDA), and portable game device. Examples of the registration terminal 30 include a personal computer and other types of communication terminals.

Figure 2A:
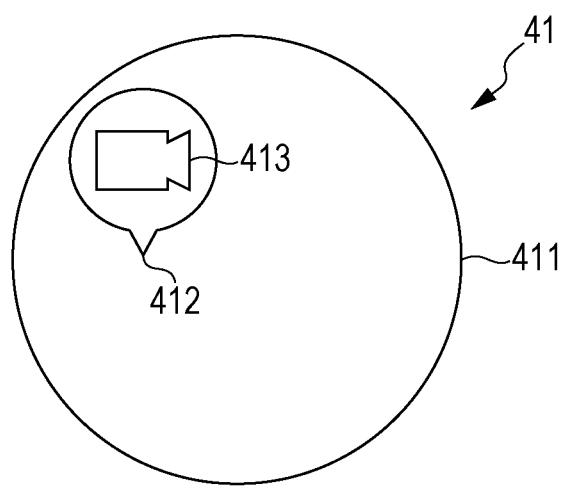
FIGS. 2A through 2C illustrate the overview of an EMM.
Figure 2B:
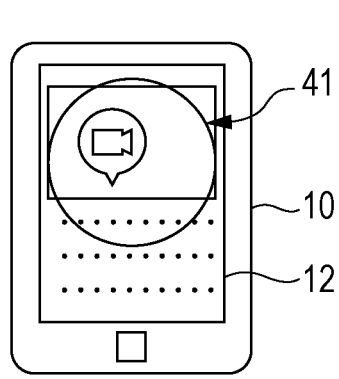
Figure 2C:
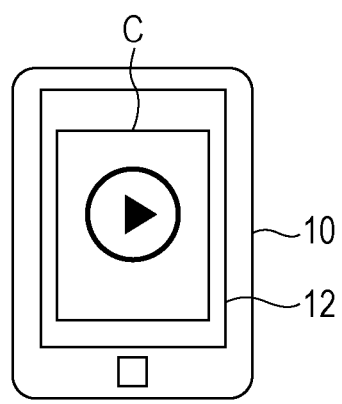

FIGS. 2A through 2C illustrate the overview of an EMM.

FIG. 2A is a schematic diagram of the marker 41. As illustrated in FIG. 2A, the marker 41 includes a feature boundary 411, an anchor point 412, and a media icon 413. The feature boundary 411 is represented by an image of a circular line, and encircles an image element of the printed material 40. As illustrated in FIG. 2B, when capturing an image of the printed material 40, the user of the user terminal 10 operates the user terminal 10 such that the entire marker 41 is located within the imaging range. The anchor point 412 is location information that identifies the location of the image element to which a digital content is linked. The media icon 413 is an icon that identifies the type of the digital content. In this example, the media icon 413 is an icon image representing a video camera. This icon image indicates that the digital content is a moving image content. In this case, as illustrated in FIG. 2C, the user terminal 10 having captured the image of the marker 41 displays a moving image C by reproducing a moving image content provided from the image retrieval server 20. A moving image content is a digital content related to an image element of the printed material 40.

The digital content associated with the marker 41 may be a still image content, a Web content, or other types of digital contents.

Figure 3:
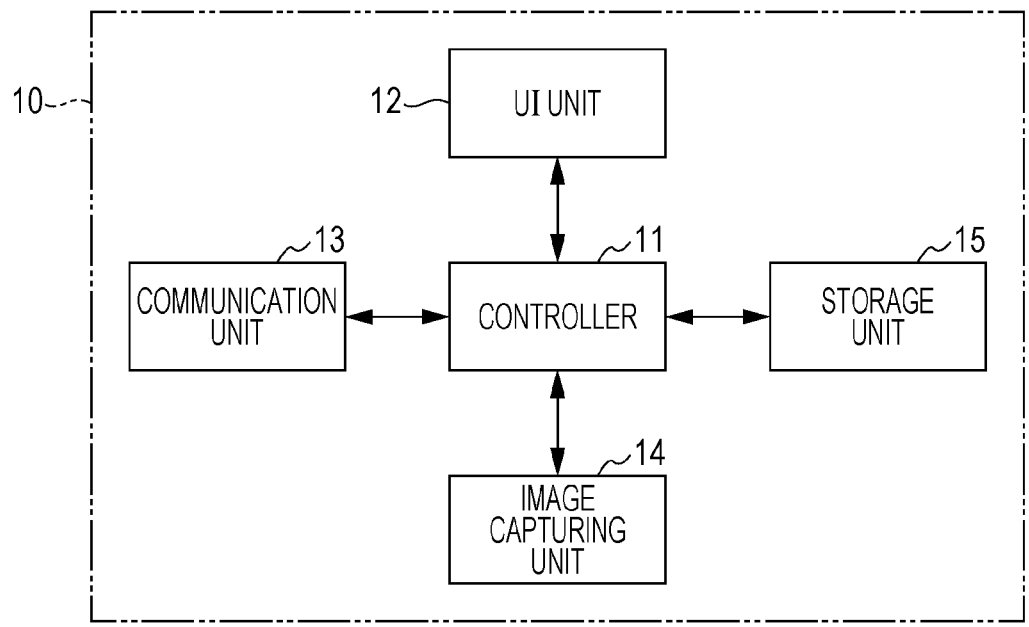
FIG. 3 is a block diagram illustrating the hardware configuration of a user terminal according to the first exemplary embodiment.

FIG. 3 is a block diagram illustrating the hardware configuration of the user terminal 10. As illustrated in FIG. 3, the user terminal 10 includes a controller 11, a user interface (UI) unit 12, a communication unit 13, an image capturing unit 14, and a storage unit 15.

The controller 11 includes a processor having a central processing unit (CPU), a read only memory (ROM), and a random access memory (RAM). The CPU controls each unit of the user terminal 10 by reading a control program stored in the ROM or the storage unit 15 to the RAM and executing the read control program. Further, the controller 11 includes an image processing circuit, which is, for example, an application specific integrated circuit (ASIC), and performs image processing using the image processing circuit. The UI unit 12 is an operation display that provides a graphical user interface (GUI), and includes a display panel that displays an image on a display surface, and a touch screen that is disposed on the display surface and is operated by the user.

The user terminal 10 may include other operation units that receive operations from physical keys and the like, and may have a function that receives voice input operations.

The communication unit 13 includes an interface for performing communications by connecting to the communication network 100. The image capturing unit 14 is an image capturing device that includes an imaging element such as a charge coupled device (CCD), and generates a captured image (a still image or a moving image) by capturing an image. An image capturing lens (not illustrated) of the image capturing unit 14 is provided on the back side of the user terminal 10. The storage unit 15 includes a storage device such as an electronically erasable and programmable ROM (EEPROM) and a flash memory, and stores the operating system (OS) and other programs that are executed by the controller 11.

Figure 4:
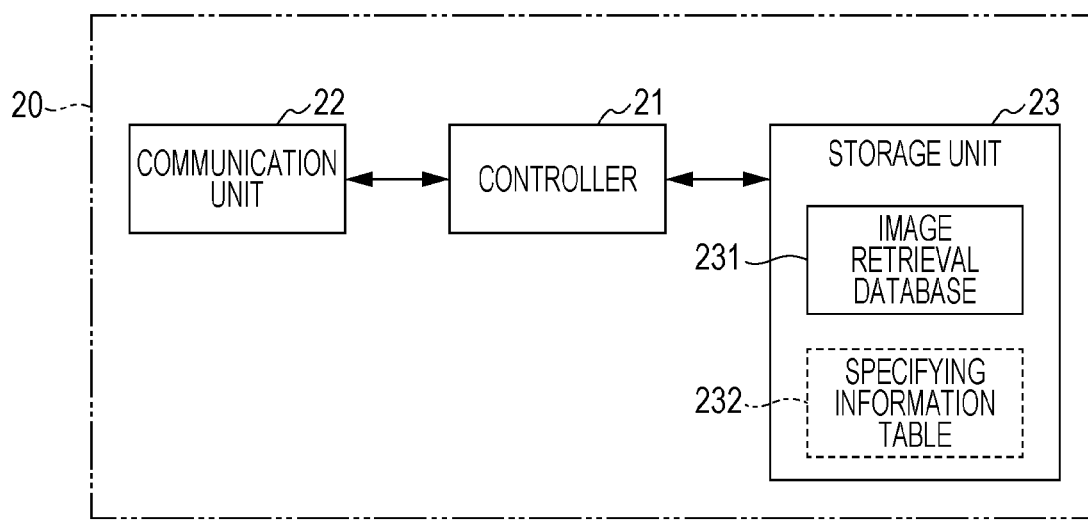
FIG. 4 is a block diagram illustrating the hardware configuration of an image retrieval server according to the first exemplary embodiment.

FIG. 4 is a block diagram illustrating the hardware configuration of the image retrieval server 20. As illustrated in FIG. 4, the image retrieval server 20 includes a controller 21, a communication unit 22, and a storage unit 23.

The controller 21 includes a processor having a CPU, a ROM, and a RAM. The CPU controls each unit of the image retrieval server 20 by reading a control program stored in the ROM or the storage unit 23 to the RAM and executing the read control program. Further, the controller 21 includes an image processing circuit, which is, for example, an ASIC, and performs image processing using the image processing circuit. The communication unit 22 is an interface for performing communications by connecting to the communication network 100. The storage unit 23 is a storage device including a hard disk device, for example, and stores a program that is executed by the controller 21. The storage unit 23 further includes an image retrieval database 231.

Note that although there is an element "SPECIFYING INFORMATION TABLE" denoted by the dashed-line box in FIG. 4, a specifying information table 232 is an element of a second exemplary embodiment described below, and is irrelevant to this exemplary embodiment.

FIG. 5 is a diagram illustrating the configuration of the image retrieval database 231.

As illustrated in FIG. 5, the image retrieval database 231 is a database in which specifying information, image identifiers, local feature amounts (an example of feature information), and content information are registered in association with each other.

The specifying information is information that specifies an image group as a retrieval target. This image group is a collection of retrieval target images, and is a part of the all the retrieval target images that are retrieval targets of the image retrieval server 20. In this example, each content provider that provides digital contents associated with retrieval target images corresponds to different specifying information. That is, in this exemplary embodiment, the specifying information is, but not limited to, an identifier that uniquely identifies the category of a retrieval target image.

The image identifier is an identifier that uniquely identifies the retrieval target image. The local feature amount represents the amount of features of a retrieval target image. More specifically, the local feature amount is the amount of local features of each of plural feature points. In this example, the local feature amount is the scale invariant feature transform (SIFT) feature amount. The SIFT feature amount is the local feature amount obtained by determining a representative luminance gradient direction of a pixel, generating a luminance gradient histogram with reference to the determined direction, and representing a feature by using a multidimensional vector (for example, a 128-dimensional vector). The SIFT feature amount is well known in the art as described, for example, in Nagahashi, Fujiyoshi, and Kanade, "Object Type Classification Using Structure-Based Feature Representation", IEEJ, Technical Meeting on Systems and Control, pp 39-44, January 2007, and therefore will not be described herein in detail.

The content information is information indicating a digital content provided from the image retrieval server 20 to the user terminal 10. In this example, the content information is information on the access destination, such as a uniform resource identifier (URI) indicating the location where the digital content is stored. However, the content information may be information representing the digital content itself.

In the manner described above, in the image retrieval database 231, the local feature amounts extracted from a retrieval target image and content information indicating the digital content associated with the retrieval target image are registered in association with each other for each specifying information.

Figure 6:
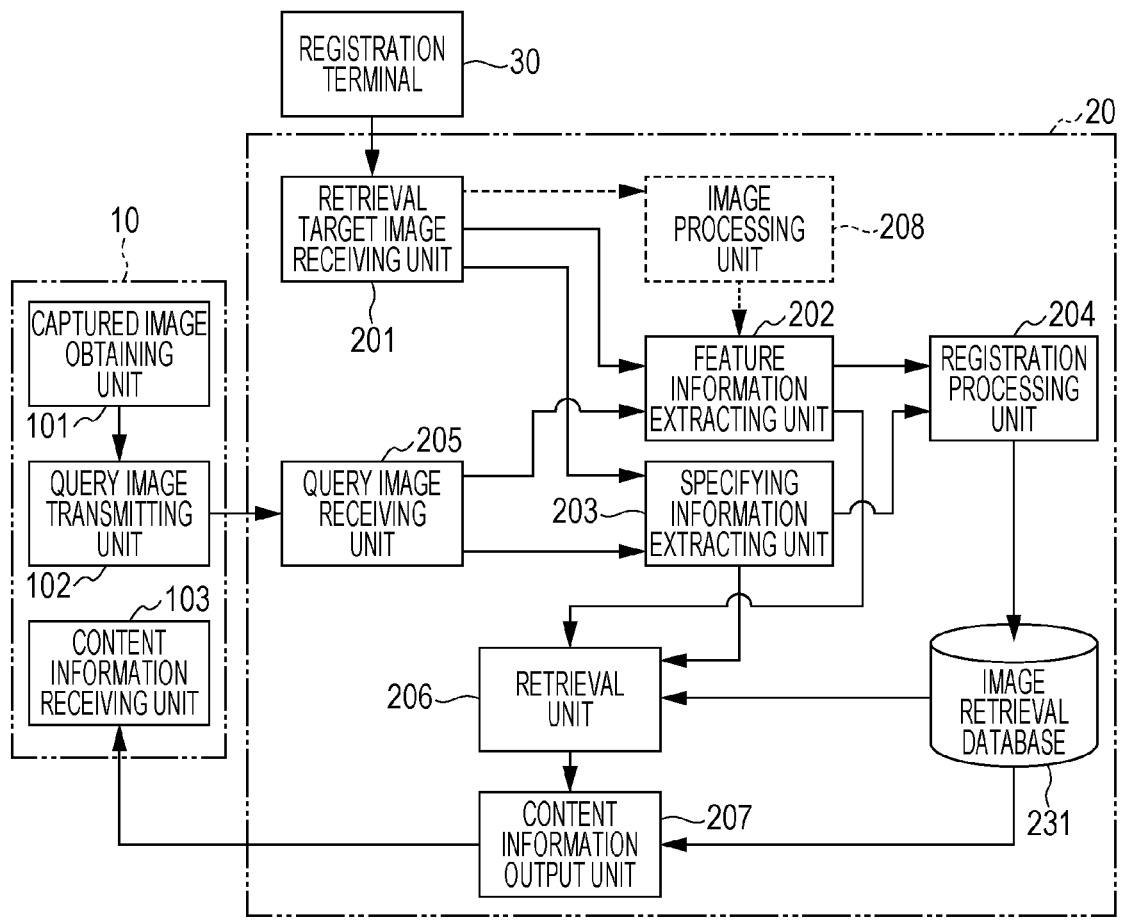
FIG. 6 is a functional block diagram illustrating a user terminal and the image retrieval server according to the first exemplary embodiment.

FIG. 6 is a block diagram illustrating the functional configuration of the user terminal 10 and the image retrieval server 20. As illustrated in FIG. 6, the image retrieval server 20 executes a program, and thereby realizes functions corresponding to a retrieval target image receiving unit 201, a feature information extracting unit 202, a specifying information extracting unit 203, a registration processing unit 204, a query image receiving unit 205, a retrieval unit 206, and a content information output unit 207. The user terminal 10 executes a program, and thereby realizes functions corresponding to a captured image obtaining unit 101, a query image transmitting unit 102, and a content information receiving unit 103.

Note that although there is an element "IMAGE PROCESSING UNIT" denoted by the dashed-line box in FIG. 6, an image processing unit 208 is a functional element of a variation (2) of a second exemplary embodiment described below, and is irrelevant to this exemplary embodiment.

The retrieval target image receiving unit 201 of the image retrieval server 20 receives and obtains a retrieval target image, in response to a registration request of the retrieval target image from the registration terminal 30.

The feature information extracting unit 202 extracts local feature amounts of feature points of a retrieval target image provided from the retrieval target image receiving unit 201. The feature information extracting unit 202 also extracts local feature amounts of a query image provided from the query image receiving unit 205.

The specifying information extracting unit 203 extracts specifying information from the retrieval target image provided from the retrieval target image receiving unit 201. The specifying information extracting unit 203 also extracts specifying information from the query image provided from the query image receiving unit 205.

The registration processing unit 204 performs registration processing for registering data on the retrieval target image in the image retrieval database 231. More specifically, the registration processing unit 204 registers the local feature amounts extracted from the retrieval target image by the feature information extracting unit 202, in association with the specifying information of the retrieval target image extracted by the specifying information extracting unit 203, in the image retrieval database 231. In this step, the registration processing unit 204 registers content information indicating a digital content that is obtained from the registration terminal 30, in association with the specifying information and the local feature amounts, in the image retrieval database 231.

The captured image obtaining unit 101 of the user terminal 10 obtains an image captured by the image capturing unit 14.

The query image transmitting unit 102 transmits, to the image retrieval server 20, a query image for image retrieval, on the basis of the captured image obtained by the captured image obtaining unit 101.

The query image receiving unit 205 (an example of an obtaining unit) of the image retrieval server 20 receives and obtains the query image transmitted from the query image transmitting unit 102.

The retrieval unit 206 performs retrieval processing on retrieval target images specified by the specifying information, using the local feature amounts. The retrieval unit 206 retrieves a retrieval target image similar to the query image transmitted from the query image transmitting unit 102, on the basis of the image retrieval database 231. The retrieval unit 206 obtains, from the image retrieval database 231, local feature amounts associated with the specifying information extracted by the specifying information extracting unit 203, and compares the obtained local feature amounts with the local feature amounts of the query image extracted by the feature information extracting unit 202 so as to determine a corresponding point for each feature point. The retrieval unit 206 retrieves a retrieval target image similar to the query image on the basis of the determined corresponding points, and identifies the image identifier of the retrieved retrieval target image.

The content information output unit 207 (an example of an output unit) outputs content information corresponding to the retrieval target image retrieved by the retrieval unit 206 to the user terminal 10. The content information output unit 207 obtains, from the image retrieval database 231, the content information which is associated with an image identifier of the retrieval target image retrieved by the retrieval unit 206. Then, the content information output unit 207 transmits and outputs the content information to the user terminal 10.

The content information receiving unit 103 of the user terminal 10 receives the content information output from the content information output unit 207.

Figure 7:
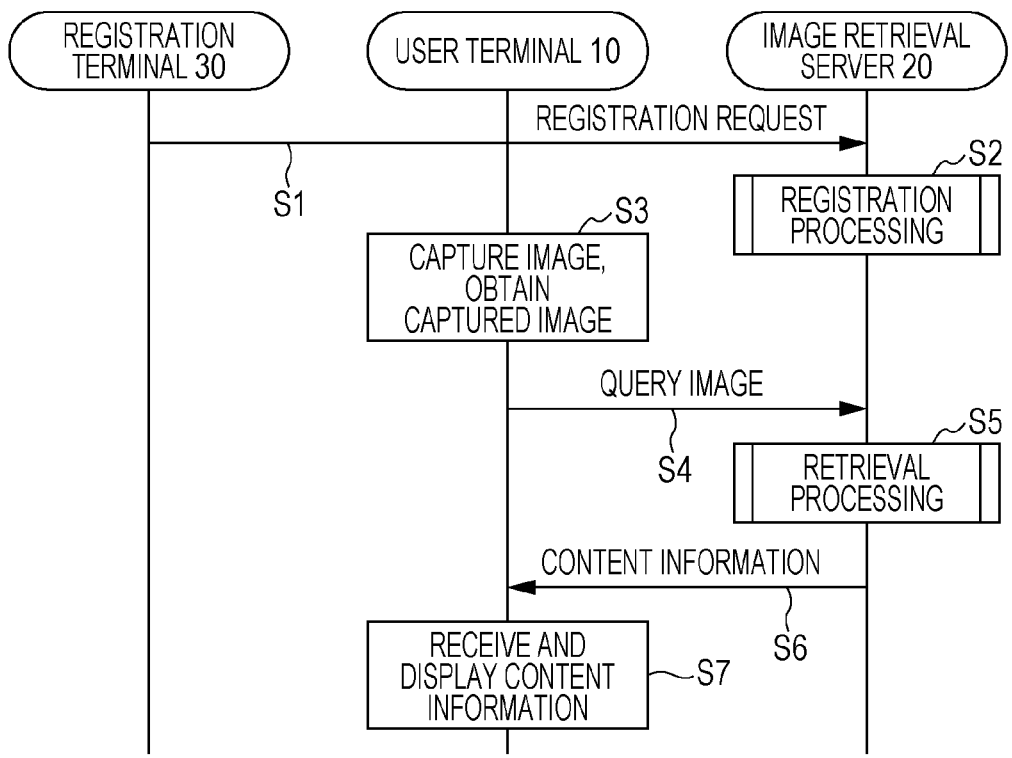
FIG. 7 illustrates a sequence diagram illustrating processing executed by the image retrieval system according to the first exemplary embodiment.

FIG. 7 is a sequence diagram illustrating the flow of processing executed by the image retrieval system 1.

When the user performs an operation for requesting registration of a retrieval target image in the image retrieval server 20, the registration terminal 30 transmits a registration request of the retrieval target image to the image retrieval server 20 (step S1). This registration request includes a retrieval target image, content information, and a destination address for transmitting data to the registration terminal 30. A destination address for identifying the destination to which the registration terminal 30 transmits the registration request is set in advance in a program executed by the registration terminal 30, for example. The controller 21 of the image retrieval server 20 having received the registration request through the communication unit 22 executes registration processing (step S2).

Figure 8:
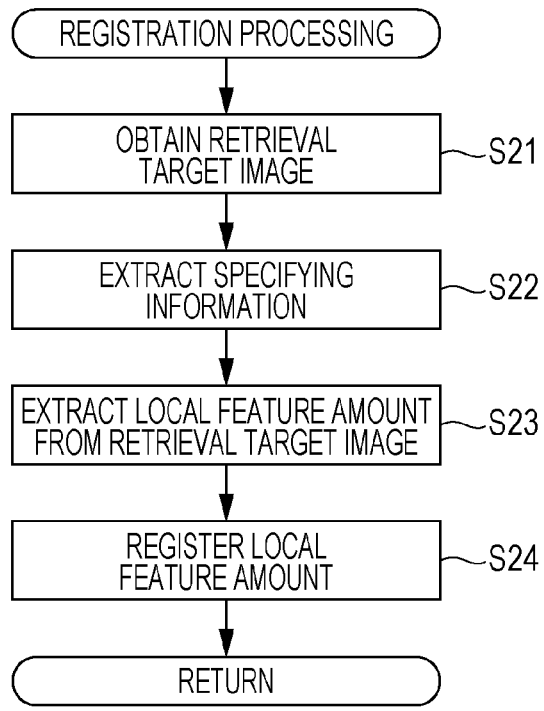
FIG. 8 is a flowchart illustrating the flow of registration processing according to the first exemplary embodiment.
Figure 9A:
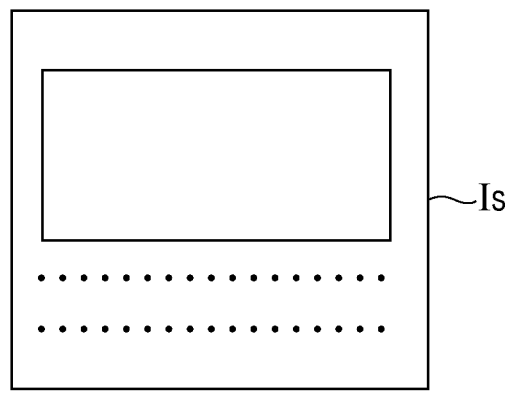
FIGS. 9A through 9C illustrate a specific example of registration processing according to the first exemplary embodiment.
Figure 9B:
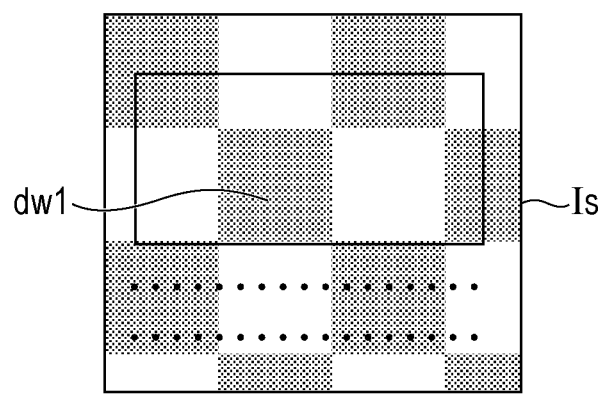
Figure 9C:
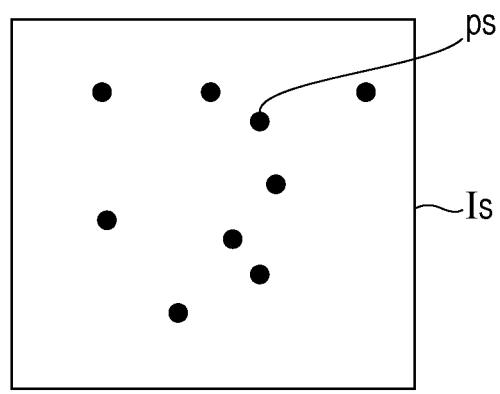

FIG. 8 is a flowchart illustrating the flow of registration processing. FIGS. 9A through 9C illustrate a specific example of registration processing.

The controller 21 of the image retrieval server 20 obtains a retrieval target image included in the registration request (step S21). Then, the controller 21 extracts specifying information from the obtained retrieval target image (step S22). It is now assumed that a retrieval target image Is of FIG. 9A is obtained by the controller 21. In this case, as illustrated in FIG. 9B, the controller 21 performs image processing for decoding information from a digital watermark dw1 on the retrieval target image Is, and thereby extracts specifying information. The digital watermark dw1 is added to the retrieval target image by an operation performed by the registration terminal 30. In this example, the controller 21 extracts specifying information "G001".

Then, the controller 21 detects feature points from the obtained retrieval target image, and extracts the local feature amounts of the detected feature points (step S23). In this example, as illustrated in FIG. 9C, the controller 21 detects feature points ps (indicated by black circles) such as edges and corners of the retrieval target image Is, and extracts the local feature amounts of the detected feature points ps. For simplicity of illustration, only one feature point is denoted by "ps" in FIG. 9C.

Not that although the digital watermark dw1 is superimposed on the retrieval target image, its effect on detection of feature points and the local feature amounts may be ignored.

Then, the controller 21 registers, in the image retrieval database 231, the local feature amounts of the respective feature points extracted in the processing of step S23 (step S24). In this step, the controller 21 registers an image identifier and the local feature amounts, in association with the specifying information extracted in the processing of step S22. More specifically, the controller 21 assigns an image identifier to the retrieval target image Is obtained in the processing of step S21, and registers plural local feature amounts extracted from the retrieval target image Is. Referring to FIG. 5, each of the local feature amounts "Vs1", . . . , and "Vsk" associated with the specifying information "G001" and the image identifier "IMG-1" is the local feature amount extracted from the retrieval target image with the image identifier "IMG-1". In the processing of step S24, the controller 21 also registers, in the image retrieval database 231, content information included in the registration request.

The above is the description of the registration processing.

The image retrieval server 20 transmits the retrieval target image Is for which the registration processing is performed to the registration terminal 30, using the destination address transmitted in the processing of step S1. The registration terminal 30 generates a printed material 40 by printing and outputting the retrieval target image Is. The image retrieval server 20 executes registration processing with the procedure described above, each time a registration request of a retrieval target image is received.

The discussion returns to FIG. 7.

It is assumed that the user of the user terminal 10 captures an image of the printed material 40 using the user terminal 10. In this case, the controller 11 of the user terminal 10 causes the image capturing unit 14 to capture an image of the printed material 40, and obtains the image captured by the image capture (step S3). Then, the controller 11 transmits the obtained query image to the image retrieval server 20 through the communication unit 13 (step S4). The destination address for identifying the destination to which the user terminal 10 transmits the query image is set in advance in a program executed by the controller 11 of the user terminal 10, for example. Further, in the processing of step S4, the user terminal 10 also transmits to the registration terminal 30 a destination address to which data is transmitted. The controller 21 of the image retrieval server 20 having received the query image through the communication unit 22 executes retrieval processing on the basis of the query image (step S5).

Figure 11A:
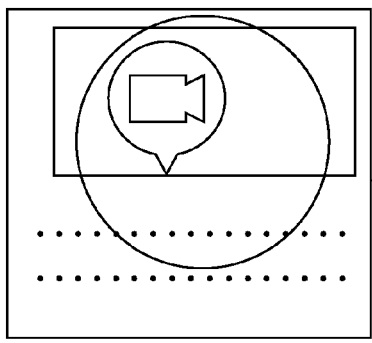
FIGS. 11A through 11C illustrate a specific example of retrieval processing according to the first exemplary embodiment.
Figure 11B:
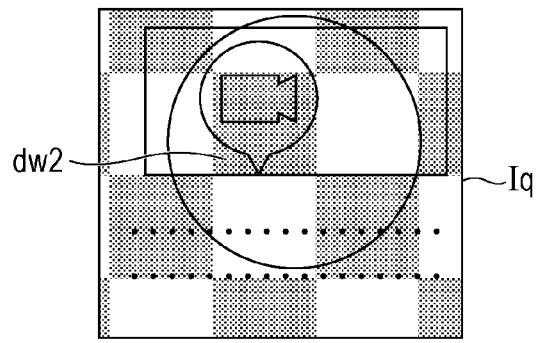
Figure 11C:
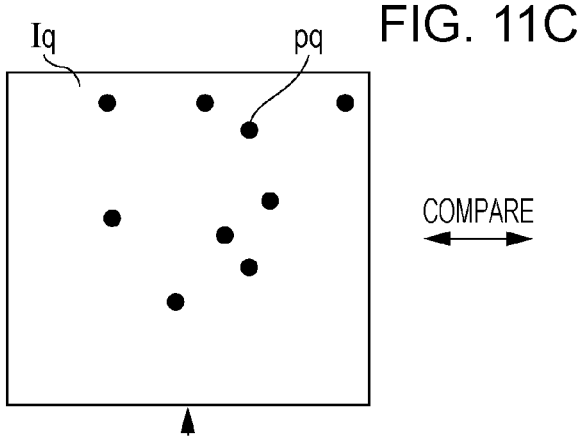

FIG. 10 is a flowchart illustrating the flow of retrieval processing. FIGS. 11A through 11C illustrate a specific example of retrieval processing.

First, the controller 21 receives a query image (step S51). Then the controller 21 detects feature points from the obtained query image, and extracts the local feature amounts of the detected feature points (step S52). It is now assumed that a query image Iq of FIG. 11A is obtained by the controller 21. As illustrated in FIG. 11B, on the query image Iq, specifying information of this query image is superimposed as a digital watermark dw2. In this case, as illustrated in FIG. 11C, the controller 21 extracts the local feature amounts of the feature points pq from the query image Iq. For simplicity of illustration, only one feature point is denoted by "pq" in FIG. 11C.

Then, the controller 21 extracts specifying information from the obtained query image (step S53). In this example, the controller 21 performs image processing for decoding information from the digital watermark dw2 on the query image Iq, and thereby extracts specifying information. This image processing may be the same as that performed when extracting the specifying information from the retrieval target image. In this example, the controller 21 extracts specifying information "G001".

Then, the controller 21 obtains the local feature amounts to be used for retrieval processing from the image retrieval database 231, and compares the obtained local feature amounts with the local feature amounts of the query image (step S54). The controller 21 compares the local feature amounts of the feature points pq with the respective local feature amounts that are registered in the image retrieval database 231 in association with the specifying information extracted in the processing of step S53. As illustrated in FIG. 11C, the controller 21 obtains the local feature amounts corresponding to each of the image identifiers "IMG-1", "IMG-2", . . . , "IMG-N" associated with the specifying information "G001", and compares the local feature amounts of the feature points pq with the obtained local feature amounts. That is, the controller 21 selects an image group specified by the specifying information "G001" as a retrieval target. On the other hand, the controller 21 does not use, in the retrieval processing, the local feature amounts (that is, an image group) associated with specifying information, such as specifying information "G002" and "G003", other than the specifying information extracted in the processing of step S53 (for example, does not obtain from the image retrieval database 231).

Then, the controller 21 performs image retrieval processing that retrieves a retrieval target image similar to the query image, on the basis of the comparison result of step S54 (step S55). In this step, the controller 21 calculates the similarity with the local feature amount obtained in step S54, for each feature point pq of the query image Iq. A known algorithm may be used for calculating the similarity between the local feature amounts. The controller 21 determines corresponding points in the retrieval target image on the basis of the calculated similarity, and thereby retrieves a retrieval target image similar to the query image. For example, the controller 21 retrieves a retrieval target image having the greatest number of corresponding points and having the number of corresponding points greater than a threshold.

The controller 21 obtains content information associated with the image identifier of the retrieved retrieval target image, from the image retrieval database 231 (step S56). For example, in the case where the retrieval target image with the image identifier "IMG-1" is the retrieval result, the controller 21 obtains content information "Ct-1".

The above is the description of the retrieval processing. The image retrieval server 20 performs the processing with the procedure described above, each time a query image is received.

The discussion returns to FIG. 7.

When the retrieval processing ends, the controller 21 of the image retrieval server 20 transmits and outputs the content information obtained in the processing of step S56 to the user terminal 10 through the communication unit 22, on the basis of the destination address transmitted in the processing of step S4 (step S6). The controller 11 of the user terminal 10 having received the content information through the communication unit 13 obtains and displays a digital content on the basis of the received content information (step S7).

The above is the description of operations of the image retrieval system 1.

In the image retrieval system 1 of the first exemplary embodiment described above, the image retrieval server 20 extracts specifying information that specifies an image group as a retrieval target from a query image, in retrieval processing. Then, the image retrieval server 20 obtains, from the image retrieval database 231, local feature amounts of each retrieval target image corresponding to the specifying information, and compares the obtained local feature amounts with the local feature amounts of the query image. Accordingly, in the image retrieval system 1, image retrieval is performed only on retrieval target images on the basis of the specifying information, without requiring the user of the user terminal 10 to specify an image group as a retrieval target (retrieval target images). Since image retrieval is performed only on the specified retrieval target images, the retrieval result is not obtained from an image group corresponding to different specifying information. Further, the processing amount of the retrieval processing is reduced.

Second Exemplary Embodiment

Next, a description will be given of a second exemplary embodiment of the present invention.

In an image retrieval system 1 of the second exemplary embodiment, specifying information is extracted from a query image on the basis of an image of an object, such as an icon image, that is visually recognized by humans.

The apparatuses included in the image retrieval system 1 of the second exemplary embodiment and the hardware configuration of the apparatuses may be the same as those of the first exemplary embodiment. Further, the functional configuration of the image retrieval system 1 of the second exemplary embodiment may be the same as that of the first exemplary embodiment, except for a part related to the function for extracting specifying information.

In the following description, the same parts as those of the first exemplary embodiment will not be further described. Further, the same elements and processing steps as those of the first exemplary embodiment are denoted by the same reference numerals, and will not be further described.

FIGS. 12A and 12B illustrate a method by which the image retrieval system 1 extracts specifying information according to this exemplary embodiment. FIG. 12A illustrates an example of a printed material 40 according to this exemplary embodiment. As illustrated in FIG. 12A, in the printed material 40, an icon image 414 indicating specifying information is contained inside a feature boundary 411. In this example, the icon image 414 is a rectangular image with a star inside, and is an image (for example, the logo of a content provider or the like) that represents the specifying information. Referring to FIG. 12B, a query image Iq1 obtained by capturing an image of the printed material 40 is illustrated. Since the icon image 414 is located inside the feature boundary 411, an object image A obtained by capturing an image of the icon image 414 is contained in the query image Iq1.

In the case where the query image Iq1 of FIG. 12B is obtained in the processing of step S51 of retrieval processing, the controller 21 of the image retrieval server 20 detects an object image indicating the specifying information from the query image Iq1 in the processing of step S53. The controller 21 stores the specifying information table 232 of FIG. 12C in the storage unit 23, and detects an object image contained in the query image on the basis of the specifying information table 232. The specifying information table 232 is a data table in which specifying information and an object image that uniquely identifies the specifying information are registered in association with each other. The controller 21 detects an object image registered in the specifying information table 232 from the query image Iq1, using a known method such as pattern matching, for example. In this step, if a mark image serving as a mark of the object image (for example, a rectangular image described above) is contained in the printed material 40, the controller 21 may detect the object image by recognizing the mark image.

Then, the controller 21 extracts specifying information associated with the object image that is detected from the query image Iq1, on the basis of the specifying information table 232. The controller 21 performs the processing of step S54 of the retrieval processing and that follows, on the basis of the extracted specifying information.

In the registration processing, the image retrieval server 20 uses a retrieval target image containing an object image that is uniquely associated with specifying information. Accordingly, the registration terminal 30 transmits a retrieval target image containing an object image corresponding to specifying information specified by the user to the image retrieval server 20. The image retrieval server 20 having received the retrieval target image detects the object image contained in the retrieval target image on the basis of the specifying information table 232, and extracts the specifying information. After the specifying information is extracted, the image retrieval server 20 performs registration processing in the same manner as the first exemplary embodiment.

Variations of Second Exemplary Embodiment

The variations described below may be appropriately combined with each other.

(1) In the image retrieval system 1 of the second exemplary embodiment described above, in the case where a feature point is detected from an object image contained in a query image, the retrieval processing may be performed without using this feature point. Thus, in the image retrieval system 1, the image retrieval processing is executed without being affected by the icon image 414.

It is assumed that the controller 21 detects the object image A from the query image Iq1 as illustrated in FIG. 12B, and also detects a feature point pqj representing the feature of the object image A as illustrated in FIG. 13. In this case, the controller 21 determines corresponding points for the feature points that are detected from the area excluding the object image A of the query image Iq1, on the basis of the local feature amounts in the image retrieval database 231. On the other hand, the controller 21 does not use the feature point pqj detected from the object image A in the image retrieval processing, and does not determine its corresponding point. The controller 21 performs image retrieval processing on the basis of the local feature amounts of the feature points detected from the area excluding the object image A. The operations of the image retrieval system 1 in step S55 of the image retrieval processing and that follow may be the same as those of the second exemplary embodiment described above.

When performing registration processing, the image retrieval server 20 may register, in the image retrieval database 231, the local feature amounts of the feature points detected from the area excluding the object image in the retrieval target image.

(2) In the image retrieval system 1 of the second exemplary embodiment described above, in the case where an image variation (that is, noise) due to the way that the user terminal 10 captures an image of the printed material 40 or the environment in which the image is captured is contained in the query image, detection of feature points and extraction of local feature amounts may be performed after performing image processing that reduces image variation on the query image. This image variation is an image distortion in the query image due to the way of capturing an image, for example. If the user terminal 10 is inclined in the horizontal direction when an image is captured using a camera function, the obtained captured image might be distorted into a parallelogram shape or a trapezoidal shape in the horizontal direction. If the image capturing device is inclined in the vertical direction, the obtained captured image might be distorted into a parallelogram shape or a trapezoidal shape in the vertical direction. The feature points and the local feature amounts detected from the query image may vary depending on the presence or absence of this type of image distortion and the degree of image distortion. If an image distortion occurs in the query image, the accuracy of the image retrieval processing might be reduced.

An image retrieval server 20 of this variation realizes a function corresponding to the image processing unit 208, in addition to the functional configuration described in FIG. 6. The image processing unit 208 performs image processing on the query image such that the object image detected from the query image becomes close to the object image of the specifying information corresponding to the object image registered in the specifying information table 232. The feature information extracting unit 202 extracts feature points and extracts the local feature amounts, on the basis of the query image after the image processing by the image processing unit 208.

Figure 14:
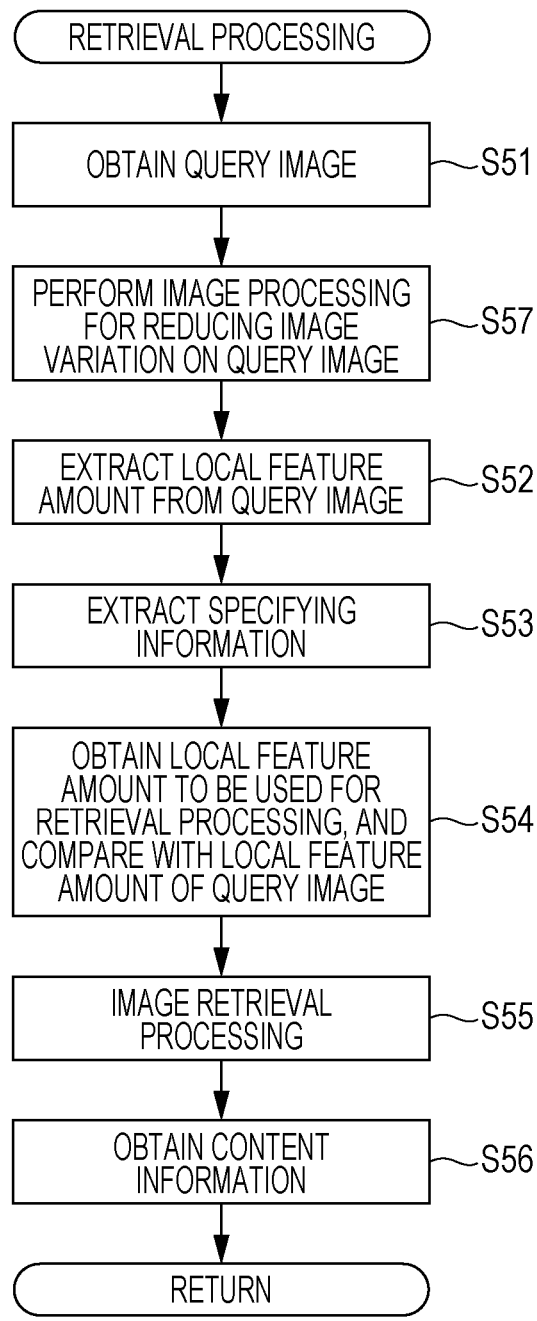
FIG. 14 is a flowchart illustrating the flow of retrieval processing according to a variation (2) of the second exemplary embodiment.

FIG. 14 is a flowchart illustrating the flow of retrieval processing executed by the image retrieval server 20.

Figure 15A:
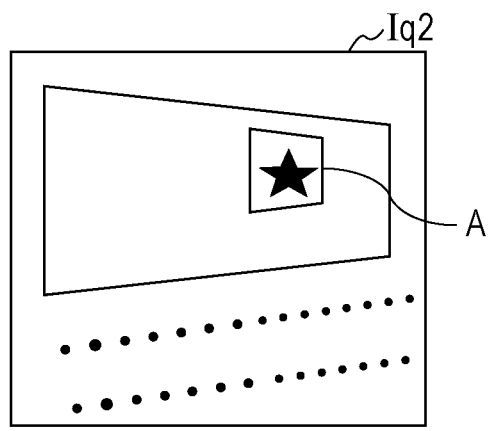
FIGS. 15A and 15B illustrate a specific example of retrieval processing according to the variation (2) of the second exemplary embodiment.
Figure 15B:
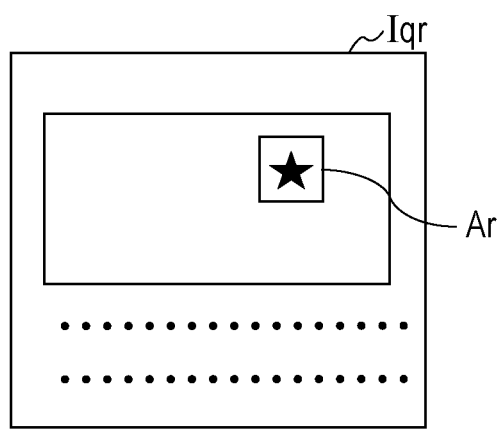

The controller 21 of the image retrieval server 20 detects an object image from the query image obtained in the processing of step S51. Then, the controller 21 compares the detected object image with the object image registered in the specifying information table 232, and specifies an image variation in the query image. In the case of an image distortion, the direction and the degree of the image distortion may be determined by referring to the size and shape of the object image in the query image. It is assumed that, as illustrated in FIG. 15A, a query image Iq2 with a trapezoidal image distortion in the horizontal direction is obtained. In this case, in the object image A differs from the object image registered in the specifying information table 232, and is deformed due to the image distortion. Accordingly, the controller 21 performs image processing (geometric transformation) on the query image such that the detected object image becomes close to the object image registered in the specifying information table 232 (step S57). Thus, as illustrated in FIG. 15B, a query image Iqr with reduced image distortion is obtained. This query image Iqr contains an object image Ar whose image distortion is reduced by the image processing.

It is known that image retrieval using the SIFT feature amount is less likely to be affected by a reduction in retrieval accuracy due to the difference in the size between a query image and a retrieval target image. Thus, the controller 21 may perform image processing on the query image such that the shape of the detected object image becomes close to the shape (similar shape) of the object image registered in the specifying information table 232.

Then, in the processing of step S52, the controller 21 extracts the local feature amounts from the query image after the image processing. Then, in the processing of step S53, the controller 21 extracts specifying information from the query image after the image processing. After that, the controller 21 performs image retrieval processing in accordance with the procedure described above in the second exemplary embodiment.

In this variation, the local feature amount is extracted after performing image processing that reduces image variation of the query image on the basis of the object image. This configuration may be applied to image retrieval other than image retrieval involving extraction of specifying information without designation by the user, for example.

Further, in this variation, image distortion is described as image variation in the query image. However, image variation is not limited to image distortion. For example, in the case where the object image in the query image is rotated by a predetermined angle with respect to the registered object image, the image retrieval server 20 performs image processing that rotates the query image by the same angle in the reverse direction, and then performs detection of feature points and extraction of local feature amounts. Further, in the case where a variation in the brightness is determined to be present in the query image on the basis of the object image, the image retrieval server 20 performs image processing that reduces the variation in the brightness in the query image, and then performs detection of feature points and extraction of local feature amounts.

(Variations)

The present invention may be implemented in the manner different from the exemplary embodiments described above. Further, the variations described below may be combined with each other.

(Variation 1)

The image retrieval system of each of the exemplary embodiments described above may be modified as described below.

FIG. 16 illustrates the overall configuration of an image retrieval system 1a according to this variation.

As illustrated in FIG. 16, the image retrieval system 1a is an information processing system that performs image retrieval, and includes a user terminal 10, an image retrieval server 20, a registration terminal 30, and registration servers 50a, 50b, and 50c. The user terminal 10 and the registration terminal 30 have the same configuration and perform the same operations as those of the exemplary embodiments described above. The registration servers 50a, 50b, and 50c are registration apparatuses, each of which corresponds to different specifying information, and in each of which the local feature amounts and content information of retrieval target images included in an image group specified by the corresponding specifying information are registered. The specifying information is information that specifies a registration server in which the local feature amounts of an image group (retrieval target images) specified by the specifying information are registered.

The registration server 50a has a database in which data associated with the specifying information "G001" in the image retrieval database 231 of FIG. 5 is registered. The registration server 50b has a database in which data associated with the specifying information "G002" in the image retrieval database 231 of FIG. 5 is registered. The registration server 50c has a database in which data associated with the specifying information "G003" in the image retrieval database 231 of FIG. 5 is registered. The image retrieval server 20 communicates with the user terminal 10 and the registration terminal 30, and also communicates with the registration servers 50a, 50b, and 50c. That is, the image retrieval server 20 serves as a server that mediates the communication between the user terminal 10 and the registration terminal 30 and the registration servers 50*a*, 50*b*, and 50*c*. Hereinafter, the registration servers 50*a*, 50*b*, and 50*c* may be referred to collectively as "registration servers 50" when the registration servers 50*a*, 50*b*, and 50*c* do not need to be referred to individually.

In this variation, the registration server 50 may perform registration processing, and register the local feature amounts and content information in the database. Alternatively, the image retrieval server 20 may perform registration processing, and register the local feature amounts and content information in the database of the registration server 50. Further, in this variation, three registration servers 50*a*, 50*b*, and 50*c* are provided. However, two or four or more registration servers 50 may be provided.

The image retrieval server 20 does not include the image retrieval database 231, but instead stores an apparatus management table 233 of FIG. 17 in the storage unit 23. The apparatus management table 233 is a data table in which specifying information and an identifier (hereinafter referred to as an "apparatus identifier") that uniquely identifies the registration server 50 are associated with each other. In FIG. 17, the apparatus identifiers are represented by the reference numerals of the registration servers 50*a*, 50*b*, and 50*c*. That is, in the apparatus management table 233, the corresponding relationship between the specifying information and the apparatus identifier that identifies the registration server 50 storing the local feature amounts of the image group specified by the specifying information is specified.

The apparatus identifier may be access destination information (communication address) for accessing each registration server 50. Examples of the access destination information include a uniform resource locator (URL) of the service involving retrieval processing, and destination information indicating the destination of a query image.

Figure 18:
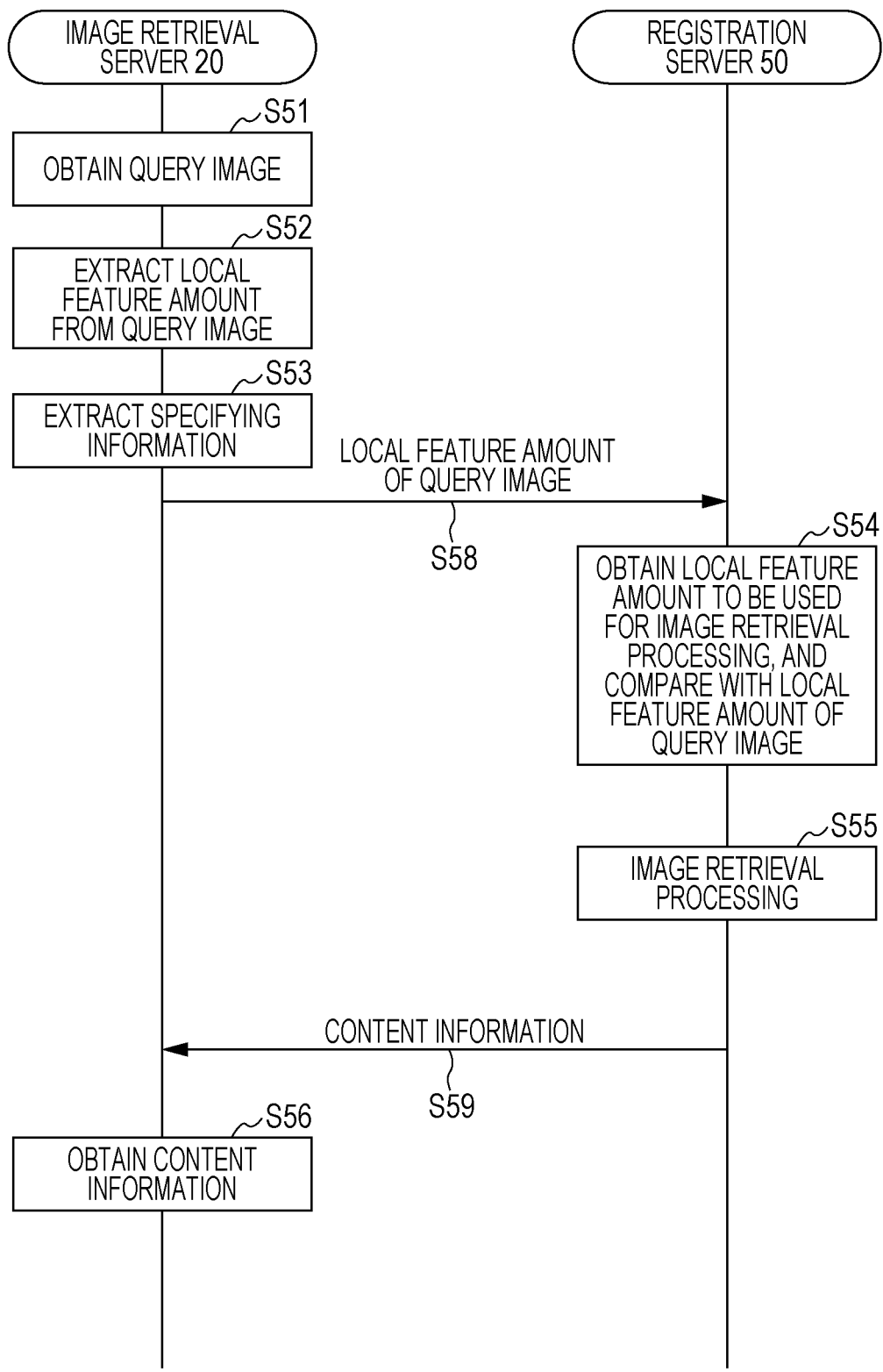
FIG. 18 is a sequence diagram illustrating the flow of retrieval processing according to the variation 1.

FIG. 18 is a sequence diagram illustrating the flow of retrieval processing according to this variation.

The controller 21 of the image retrieval server 20 performs processing of steps S51 through S53 so as to extract the local feature amounts from a query image and extract specifying information.

Then, the controller 21 determines the registration server 50 corresponding to the specifying information extracted in the processing of step S53 by referring to the apparatus management table 233, and transmits the local feature amounts of the query image to the determined registration server 50 (step S58). For example, if the specifying information that is obtained on the basis of the query image is "G001", the controller 21 requests the registration server 50*a* to perform retrieval processing.

The registration server 50 compares the local feature amounts received from the image retrieval server 20 with the local feature amounts registered in the registration server 50 (step S54), and performs image retrieval processing that retrieves a retrieval target image similar to the query image (step S55). That is, the registration server 50 of this variation serves as an image retrieval apparatus (image retrieval server) of each of the exemplary embodiments of the present invention.

The registration server 50 having retrieved the retrieval target image similar to the query image obtains content information associated with the image identifier of the retrieved retrieval target image from the database, and transmits the content information to the image retrieval server 20 (step S59). For example, in the case where the registration server 50 determines the image identifier "IMG-1" as the retrieval result, the registration server 50 transmits content information "Ct-1" associated with the image identifier "IMG-1" to the image retrieval server 20. The controller 21 of the image retrieval server 20 obtains the content information from the registration server 50, and then the retrieval processing ends (step S56).

In the image retrieval system 1*a* of this variation, the image retrieval server 20 may obtain the local feature amounts from the registration server 50 and perform retrieval processing. In this case, the image retrieval server 20 transmits the image identifier as the result of the retrieval processing to the registration server 50, and obtains content information associated with the image identifier from the registration server 50.

(Variation 2)

In the image retrieval system 1*a* of the variation 1 described above, each application program may correspond to different specifying information. In this case, for example, an identifier (application identifier) that uniquely identifies an application program may be used as specifying information.

As for operations of the registration terminal 30, in the case of executing an application program and requesting the image retrieval server 20 to perform registration processing, the registration terminal 30 transmits specifying information obtained from the application to the image retrieval server 20 in the processing of step S1. As for operations of the user terminal 10, in the case of executing an application program and requesting the image retrieval server 20 to perform retrieval processing, the controller 11 of the user terminal 10 transmits specifying information obtained from the application program to the image retrieval server 20 in the processing of step S4.

In the case where the configuration of this variation is applied to the above-described variation 1, even if each provider of application programs or each provider of services based on application programs corresponds to a different registration server 50, the registration server 50 corresponding to the application program executed by the user terminal 10 is able to provide services involving retrieval processing.

In the image retrieval system 1*a* of this variation, the specifying information does not need to be contained in the retrieval target image or the query image (that is, the printed material 40).

(Variation 3)

The image retrieval system 1*a* of the variation 1 or the variation 2 described above may be modified as follows. In this variation, the registration server 50 extracts the local feature amounts from a query image, and performs retrieval processing.

Figure 19:
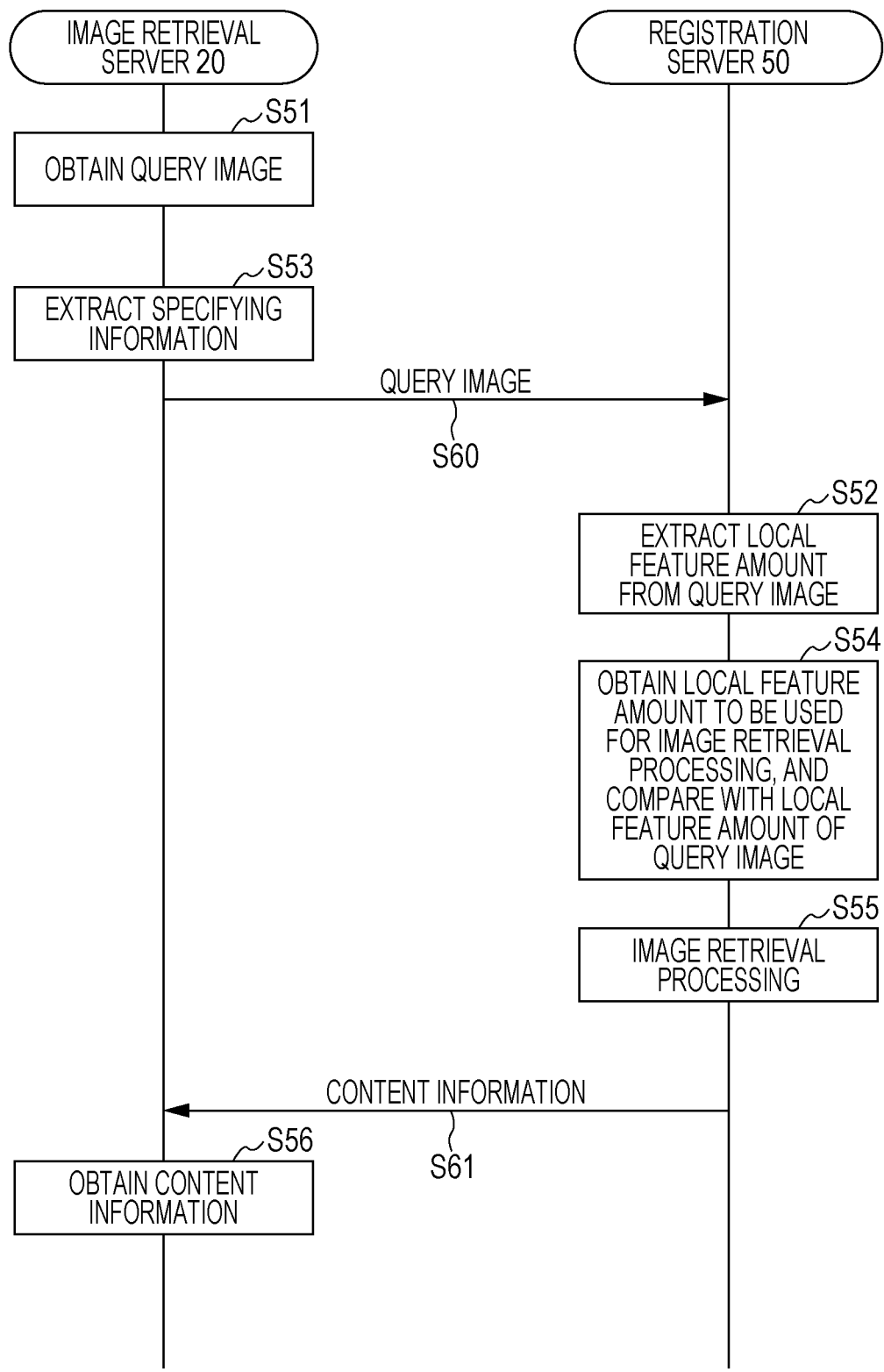
FIG. 19 is a sequence diagram illustrating the flow of retrieval processing according to a variation 3.

Referring to FIG. 19, the controller 21 of the image retrieval server 20 obtains a query image from the user terminal 10 (step S51), and extracts specifying information from the obtained query image (step S53). Then, the controller 21 transmits (forwards) the query image to the registration server 50 corresponding to the specifying information, on the basis of the extracted specifying information and the apparatus management table 233 (step S60). The registration server 50 extracts the local feature amounts from the query image received from the image retrieval server 20 (step S52), compares the extracted local feature amounts with the local feature amounts registered in the registration server 50, and performs image retrieval processing (steps S54 and S55). Then, the registration server 50 obtains content information corresponding to the result of image retrieval processing from the database, and transmits the content information to the image retrieval server 20 (step S61). The controller 21 obtains the content information from the registration server 50 (step S56), and then the retrieval processing in the image retrieval system 1*a* ends.

According to the image retrieval system 1a of this variation, the processing amount of retrieval processing in the image retrieval server 20 is reduced compared to the case of the variation 1 or the variation 2 described above.

(Variation 4)

In the image retrieval system, the user terminal 10 may extract specifying information from a query image, and transmit the specifying information to the image retrieval server 20, together with the query image. In this case, the image retrieval server 20 performs retrieval processing using the specifying information received from the user terminal 10.

Alternatively, the user terminal 10 may extract the local feature amounts from a query image, and transmit the local feature amounts to the image retrieval server 20. In this case, the image retrieval server 20 performs retrieval processing using the local feature amounts received from the user terminal 10.

Further, the registration terminal 30 may transmit specifying information that specifies this retrieval target image as a retrieval target to the image retrieval server 20, separately from the retrieval target image. In this case, the image retrieval server 20 obtains the specifying information received from the registration terminal 30, and performs registration processing.

(Variation 5)

In the image retrieval system 1, the local feature amounts extracted from a partial image forming a part of a retrieval target image or a query image may be used as specifying information. Hereinafter, a description will be given of operations of the image retrieval system 1 in the case where the registration terminal 30 and the user terminal 10 extract the local feature amounts and specifying information from a query image.

Figure 20A:
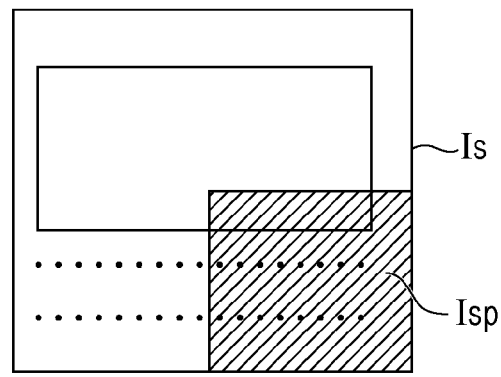
FIGS. 20A through 20D illustrate specific examples of registration processing and retrieval processing according to a variation 5.
Figure 20B:
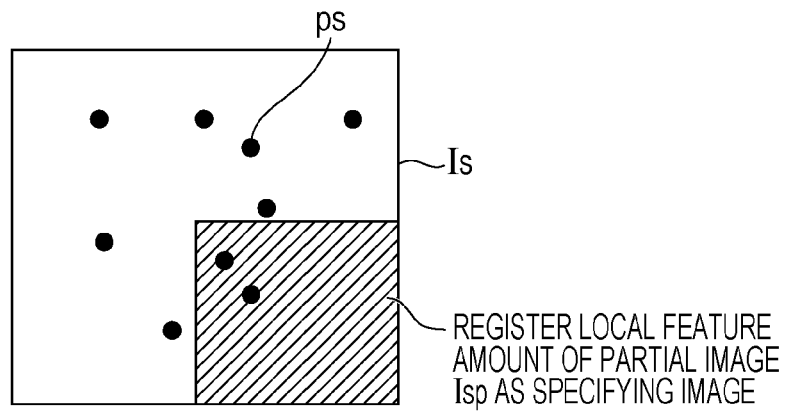

Upon requesting the image retrieval server 20 to perform registration processing, the registration terminal 30 first specifies a partial image forming a part of a retrieval target image. For example, as illustrated in FIG. 20A, the registration terminal 30 divides the image area of a retrieval target image Is into quarters in a matrix form of 2 by 2, and specifies an image area located in a predetermined position (in this example, the lower right image area) as a partial image Isp. Then, the registration terminal 30 transmits, to the image retrieval server 20, the local feature amounts extracted from the partial image Isp as specifying information, in the processing of step S1. In the registration processing in the processing of step S2, the image retrieval server 20 registers the local feature amounts transmitted as specifying information from the registration terminal 30 in the image retrieval database 231. In this example, as illustrated in FIG. 20B, the registration terminal 30 registers, in the image retrieval database 231, the local feature amounts extracted from the partial image Isp as specifying information.

Figure 21:
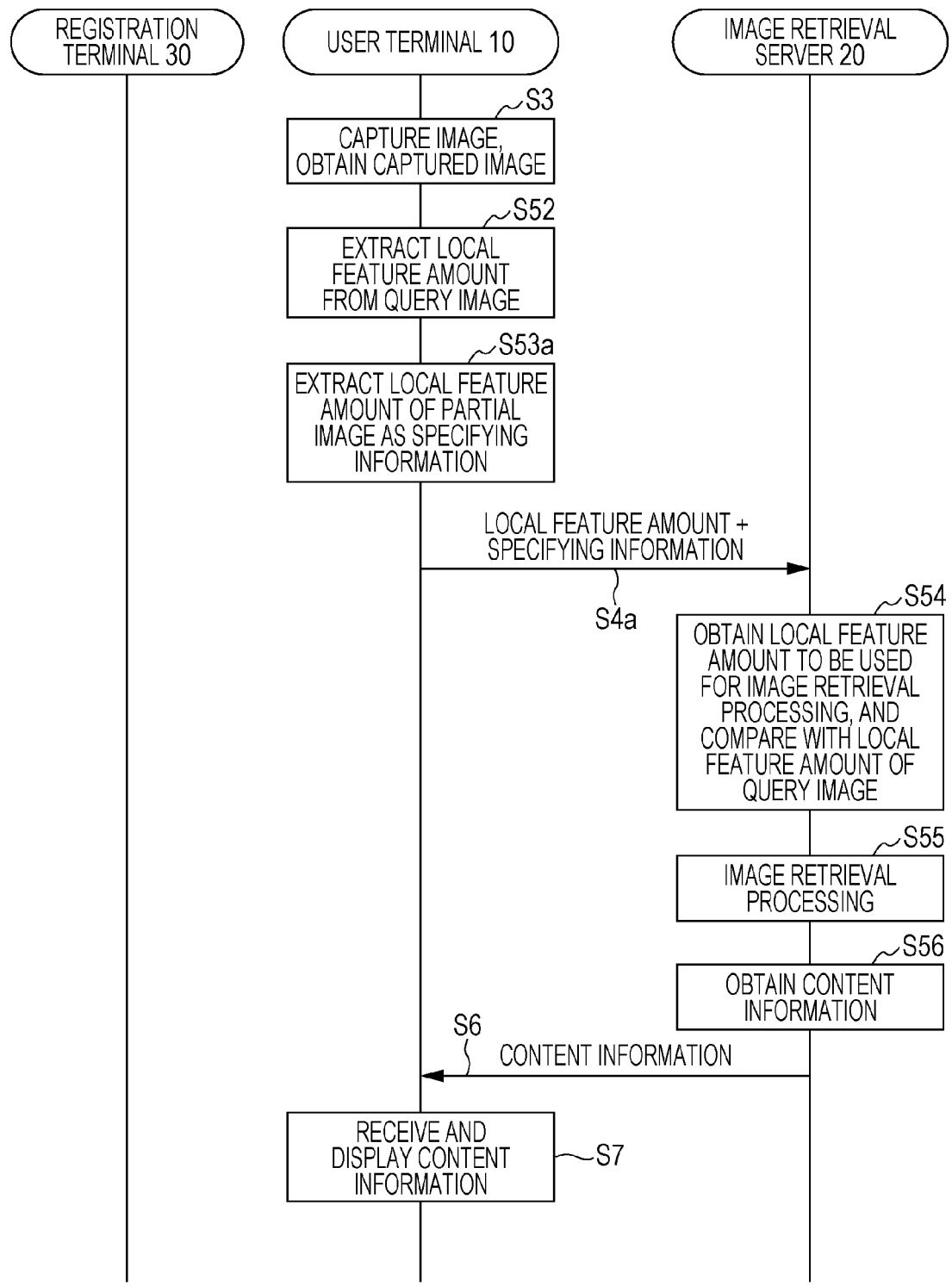
FIG. 21 is a sequence diagram illustrating the flow of retrieval processing according to the variation 5.

Next, operations of the image retrieval system 1 in the retrieval processing will be described. FIG. 21 is a sequence diagram illustrating the flow of the operations.

The controller 11 of the user terminal 10 causes the image capturing unit 14 to capture an image of the printed material 40, and obtains the image captured by the image capture (step S3). Then, the controller 11 extracts the local feature amounts from the query image, on the basis of the captured image (step S52). In this example, the query image Iq of FIG. 11A is obtained by the controller 11. Then, the controller 11 extracts, as specifying information, the local feature amounts from a partial image forming a part of the query image (step S53a). In the processing of step S53a, the controller 11 specifies, in the query image, a partial image located in a position corresponding to the position of the partial image of the retrieval target image. In this example, as in the case of the registration terminal 30, the controller 11 divides the image area of the query image into quarters in a matrix form of 2 by 2, and specifies an image area located in a predetermined position (in this example, the lower right image area) as a partial image Iqp (see FIG. 20C).

Figure 20C:
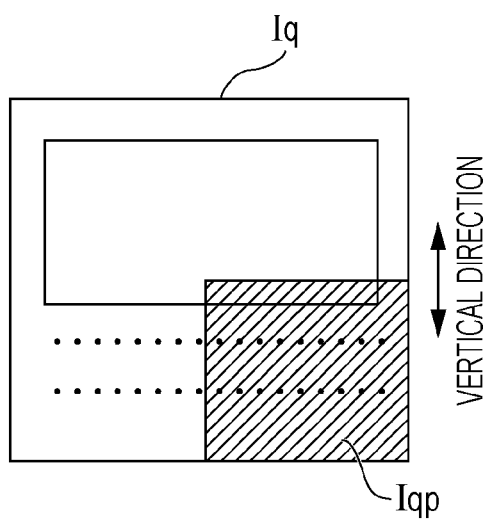

In the processing of step S53a, the controller 11 may specify the partial image of the query image after determining the vertical direction of an image element (that is, an image element of the captured image of the printed material 40) contained in the query image. This is because, the image area specified as a partial image differs between the case as illustrated in FIG. 20C where an image of the printed material 40 is captured with the vertical direction of the image element contained in the query image aligned with the vertical direction of the query image and the case where, as indicated by the dotted area in FIG. 20D, an image of the printed material 40 is captured with the vertical direction of the image element contained in the query image Iq3 not aligned with the vertical direction of the query image Iq3 (in this example, in a state in which the image element contained in the query image is rotated by 90 degrees to the right).

Figure 20D:
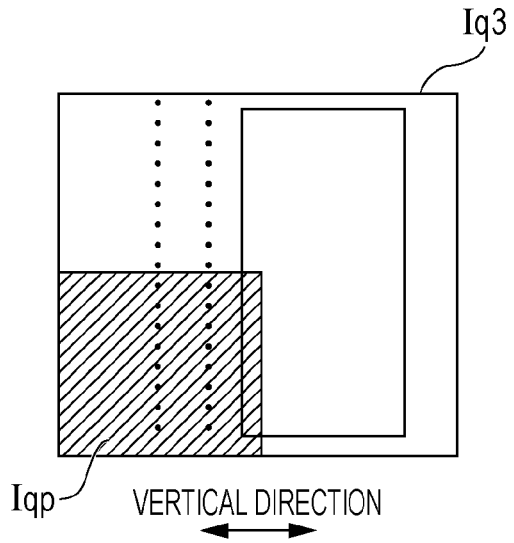

Thus, for example, the controller 11 detects, from a query image, information (direction information) specifying the vertical direction of an image element contained in the query image, such as characters and the marker 41 (for example, the media icon 413) contained in the query image. Then, the controller 11 rotates the query image such that the vertical direction of the image element contained in the query image coincides with the vertical direction of the query image, on the basis of the detected direction information. The controller 11 specifies a partial image from the rotated query image, and extracts specifying information. Alternatively, the controller 11 may specify, as a partial image, an image area that is expected to be located in a predetermined position in the case where the vertical direction of the image element contained in the query image is aligned with the vertical direction of the query image, without actually rotating the query image. In this way, even in the case where the vertical direction of the image element contained in the query image Iq3 does not coincides with the vertical direction of the query image Iq3, the controller 11 is able to accurately specify the partial image Iqp as illustrated in FIG. 20D.

Note that the direction information described above may be any information as long as the direction information indicates the shift amount between the vertical direction of the query image and the vertical direction of the image element contained in the query image.

Then, the controller 11 transmits the local feature amounts extracted from the query image and the specifying information indicating the local feature amounts of the partial image to the image retrieval server 20 through the communication unit 13 (step S4a). The controller 21 of the image retrieval server 20 having received the local feature amounts extracted from the query image and the specifying information through the communication unit 22 executes image retrieval processing (steps S54 and S55). The flow of image retrieval processing may be the same as that of the first exemplary embodiment, except that the local feature amounts of the partial image is used as specifying information. Then, the controller 21 obtains content information corresponding to the result of image retrieval processing from the database, and transmits the content information to the user terminal 10 (steps S56 and S6).

According to the image retrieval system 1 of this variation, the specifying information does not need to be contained in the retrieval target image or the query image.

The configuration that uses the local feature amounts extracted from a partial image of a query image as specifying information may be applied to the case where an apparatus other than the user terminal 10 extracts the local feature amounts and specifying information. Further, the size and shape of the partial image and the position of the partial image in the retrieval target image or in the query image are not limited to those described in the above example. For example, the conditions for specifying a partial image may be determined such that partial images of two or more retrieval target images have common local feature amounts.

(Variation 6)

The specifying information of a retrieval target image or a query image in the exemplary embodiments of present invention does not have to correspond to a content provider. The specifying information may be information indicating the type of service provided by a content provider, or information indicating the date and time when an image of a query image is captured or the date and time when a retrieval target image is registered, for example. Further, the specifying information may be the application identifier described above.

That is, the specifying information in the exemplary embodiments of the present invention may be any information as long as the specifying information is information used for specifying an image group as a retrieval target. According to the image retrieval system of this variation, regardless of the specifying information of the query image and retrieval target image, retrieval target images used in the retrieval processing are selected without requiring the user to specify an image group as a retrieval target.

(Variation 7)

The specifying information in the image retrieval database 231 does not have to match the specifying information extracted from a query image. That is, in the image retrieval database 231, the local feature amounts and content information corresponding to a retrieval target image may be registered without using specifying information of a query image. In this case as well, the image retrieval server 20 obtains the local feature amounts of each retrieval target image corresponding to specifying information extracted from a query image, and performs retrieval processing.

For example, in the case where query images are classified into smaller categories than retrieval target images, the image retrieval server 20 may use, in retrieval processing, the local feature amounts of retrieval target images in a category containing a category of a query image. Conversely, in the case where query images are classified into larger categories than retrieval target images, the image retrieval server 20 may use, in retrieval processing, the local feature amounts of retrieval target images in a category contained in a category of a query image. Further, the image retrieval server 20 may determine, on the basis of specifying information, the local feature amounts of retrieval target images in a category which is semantically related to the category of a query image, and use the determined local feature amounts in the retrieval processing.

(Variation 8)

In the image retrieval system 1 of the second exemplary embodiment described above, an object image uniquely associated with specifying information is not limited to an icon image, but may be an encoded image containing encoded information such as a barcode and a two-dimensional code. Further, the object image may be a character string of one or more characters that uniquely identifies the specifying information. That is, information indicating the specifying information of a query image is contained in the query image.

Further, in the image retrieval system 1 of the second exemplary embodiment described above, an object image that is uniquely associated with specifying information may be used in place of the media icon 413.

(Variation 9)

In the exemplary embodiments described above, a display apparatus that displays an image containing a marker 41 superimposed on the image element may be used in place of the printed material 40. In this case, the user terminal 10 captures an image (screen) displayed by the display apparatus.

(Variation 10)

In the exemplary embodiments described above, the SIFT feature amount is used as the feature amount (local feature amount) of a feature point. However, other types of feature amounts, such as the feature amount based on speeded up robust features (SURF) may be used. That is, the feature information in the exemplary embodiments of the present invention is not limited to the features of the intensity gradients, but may be information that indicates the location of a feature point (coordinates) and the feature amounts of other feature points.

Further, the feature information in the exemplary embodiments of the present invention may indicate the feature amounts that may be used for image retrieval, other than the local feature amounts of feature points.

(Variation 11)

In the exemplary embodiments described above, the image retrieval server 20 outputs content information corresponding to a retrieval target image similar to a query image. However, information that is output is not limited to content information. For example, in the case where the present invention is applied to an information processing system that retrieves a similar image, the image retrieval server 20 may transmit and output image data of a similar image retrieved from the retrieval database to the user terminal 10. In this case, a retrieval target image identified by an image identifier may be registered in the image retrieval database 231, in place of content information.

(Variation 12)

The image retrieval server 20 does not need to have a function for registering the local feature amounts in the image retrieval database 231. In this case, an image registration apparatus separately provided from the image retrieval server 20 may perform registration processing that registers the local feature amounts and content information in the image retrieval database 231.

Further, the image retrieval server 20 may be realized not by a single server apparatus, but by plural server apparatuses that operate in combination. Further, the functions realized by the image retrieval server 20 may be realized by a communication terminal (for example, the user terminal 10) that is used by the user.

The functions realized by the user terminal 10, the image retrieval server 20, the registration terminal 30, and the registration server 50 of each of the exemplary embodiments described above may be realized by one or more hardware circuits, by execution of one or more programs by an arithmetic device, or by combination of these. In the case where the functions of the user terminal 10, the image retrieval server 20, the registration terminal 30, and the registration server 50 are realized by using a program, the program may be stored in the form of being stored in a computer-readable recording medium such as a magnetic recording medium (magnetic tape, magnetic disk, hard disk drive (HDD), flexible disk (FD), and so on), an optical recording medium (optical disk and so on), a magneto-optical recording medium, and a semiconductor memory, or may be delivered over a network. Further, the present invention may be embodied as an information processing method performed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image retrieval system comprising:
   at least one processor configured to execute computer executable instructions, the computer executable instructions causing the at least one processor to implement:
      an obtaining unit configured to obtain a query image;
      a specifying information extracting unit configured to extract, from the query image, specifying information comprising a watermark which specifies retrieval target images;
      a feature information extracting unit configured to extract, from the query image, feature information to be used in image retrieval processing; and
      a retrieval unit configured to perform the image retrieval processing on retrieval target images specified by the specifying information, using the feature information.

2. The image retrieval system according to claim 1, wherein the specifying information extracting unit is configured to extract the specifying information, by comparing an object image detected from the query image with an object image which is registered in advance in association with the specifying information.

3. The image retrieval system according to claim 2,
   wherein the feature information includes feature amounts of feature points; and
   wherein the retrieval unit is further configured to perform the image retrieval processing, without using the feature amounts of the feature points contained in the detected object image, the feature points contained in the detected object image being included in the feature points contained in the query image.

4. The image retrieval system according to claim 2, further comprising:
   an image processing unit configured to perform image processing on the query image such that the detected object image becomes close to the registered object image;
   wherein the feature information extracting unit is further configured to extract the feature information from the query image after the image processing.

5. The image retrieval system according to claim 1, wherein the specifying information extracted by the specifying information extracting unit is the feature information extracted from a partial image forming a part of the query image.

6. The image retrieval system according to claim 1, further comprising:
   a plurality of registration apparatuses, each of which corresponds to different specifying information, and in each of which the feature information of the image group specified by the corresponding specifying information is registered;
   wherein the retrieval unit is further configured to perform the image retrieval processing, using the feature information registered in the registration apparatus corresponding to the specifying information extracted by the specifying information extracting unit.

7. The image retrieval system according to claim 1, further comprising:
   a registration processing unit configured to register the feature information;
   wherein the feature information extracting unit is further configured to extract the feature information from a retrieval target image that is requested to be registered;
   wherein the specifying information extracting unit is further configured to extract the specifying information from the retrieval target image that is requested to be registered; and
   wherein the registration processing unit is further configured to register, as a retrieval target in the image retrieval processing, the feature information of the retrieval target image extracted by the feature information extracting unit, in accordance with specifying information of the retrieval target image extracted by the specifying information extracting unit.

8. The image retrieval system according to claim 1, further comprising:
   a query image receiving unit configured to receive the query image transmitted from a communication terminal; and
   an output unit configured to output, when the image retrieval processing is performed on the basis of the query image received by the query image receiving unit, content information associated with a retrieval target image retrieved by the image retrieval processing to the communication terminal.

9. An information processing apparatus for use in an image retrieval system, wherein the image retrieval system includes an obtaining unit that obtains a query image, a specifying information extracting unit that extracts, from the query image, specifying information comprising a watermark which specifies retrieval target images, a feature information extracting unit that extracts, from the query image, feature information to be used in image retrieval processing, and a retrieval unit that performs the image retrieval processing on retrieval target images specified by the specifying information, using the feature information, the information processing apparatus comprising:
   the specifying information extracting unit.

10. An image retrieval method comprising:
   obtaining a query image;
   extracting, from the query image, specifying information comprising a watermark which specifies retrieval target images;
   extracting, from the query image, feature information to be used in image retrieval processing; and
   performing the image retrieval processing on retrieval target images specified by the specifying information, using the feature information.

11. A non-transitory computer readable medium storing a program causing a computer serving as an information processing apparatus in an image retrieval system to function as a specifying information extracting unit, the program causing the computer to perform:

obtaining a query image;

extracting, from the query image, specifying information comprising a watermark which specifies retrieval target images;

extracting, from the query image, feature information to be used in image retrieval processing; and performing the image retrieval processing on retrieval target images specified by the specifying information, using the feature information.

* * * * *